Oct. 29, 1946. W. C. SCRIVENER ET AL 2,410,245
UNION FOR MASTS, POLES, AND THE LIKE
Original Filed April 17, 1943 2 Sheets-Sheet 1

Inventors
William C. Scrivener
Alfred G. Brewer,
By: Smith, Michael and Gardiner,
Attorneys Oct. 29, 1946.  W. C. SCRIVENER ET AL  2,410,245
UNION FOR MASTS, POLES, AND THE LIKE
Original Filed April 17, 1943  2 Sheets-Sheet 2

Inventors:-
William C. Scrivener & Alfred G. Brewer,
By Smith, Michael and Gardiner,
Attorneys Patented Oct. 29, 1946

2,410,245

UNITED STATES PATENT OFFICE 2,410,245

UNION FOR MASTS, POLES, AND THE LIKE

William Charles Scrivener and Alfred George Brewer, Sutton Coldfield, England, assignors to Masts Limited, Birmingham, England, a British company Original application April 17, 1943, Serial No. 483,508. Divided and this application October 3, 1944, Serial No. 556,976. In Great Britain June 22, 1942

7 Claims. (Cl. 287—2)

The present application is a division of our copending application Serial No. 483,508, filed April 17, 1943, and entitled "Masts, poles, and the like."

This invention is for a union for connecting together the sections of a mast and the like and has for its object the provision of a union which is capable of being manufactured by mass production, is quickly assembled and enables a mast to be easily erected by the minimum number of personnel, and capable of being broken down into a small number of parts which are easily transported, owing to the length of the longest section being short in comparison with the size of the mast that can be erected therefrom.

According to the present invention there is provided a union adapted to be connected to and constitute a connecting link between each successive pair of a series of rigid members, whereby the said members are held against unintentional displacement relatively to one another in a longitudinal direction and are united into a tubular non-telescopic unit which when arranged upright forms, in conjunction with guys or the like operatively connected to said members, a flexible mast, wherein at least a limited range of movement in any direction is permitted between adjacent members.

The invention will be more particularly described with reference to the accompanying drawings, in which—

Figure 1:
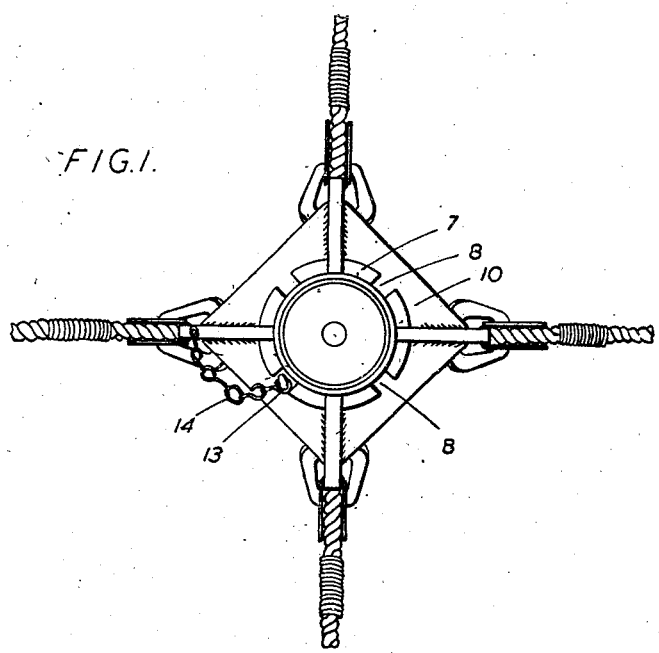
Figure 2:
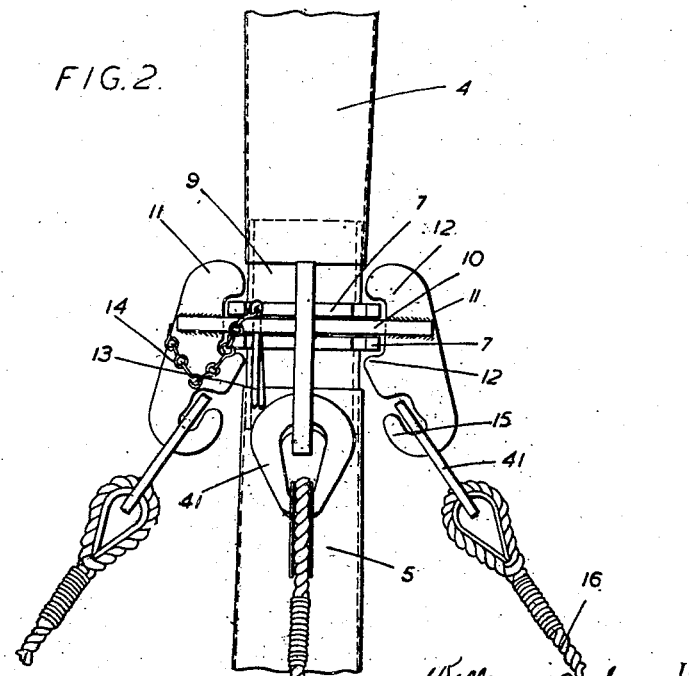
Figure 3:
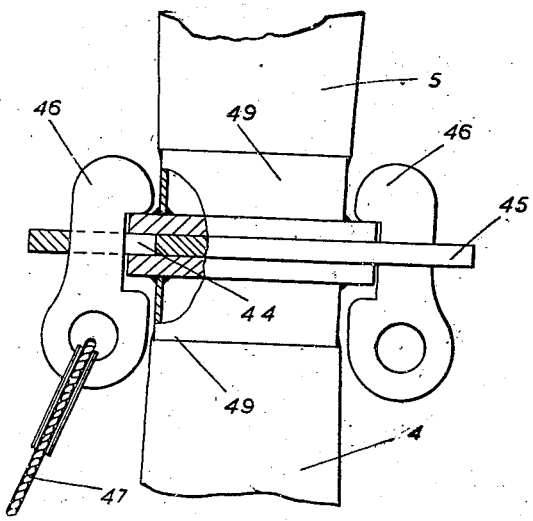
Figure 4:
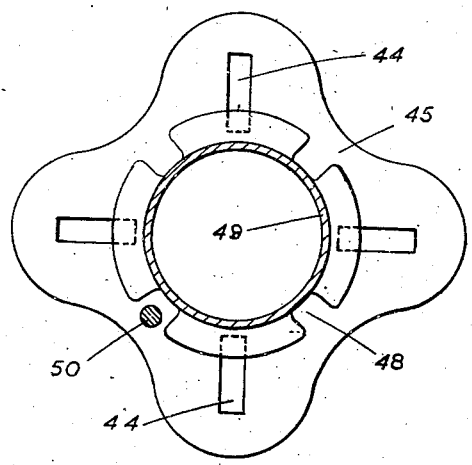

Figures 1 and 2 illustrate in plan and elevation one construction of union capable of forming an articulated joint between adjacent sections of a mast; and Figures 3 and 4 illustrate a modified construction of the union illustrated in Figures 1 and 2.

In the accompanying drawings only the union between one pair of adjacent members is shown as it will be obvious to a person skilled in the art how, where more than a pair of members is employed, the successive sections are connected together.

Referring to Figures 1 and 2, there is illustrated a suitable union between one pair of adjacent tubular members of a light mast. The union comprises a flange 7 having radially directed open slots 8 (Figure 1) formed in the periphery thereof at predetermined distances around the circumference. A flange 7 is provided upon the end of each member, for example by being formed upon a spigot 9 arranged to extend into a socket formed in the end of a member. By such a construction each member is uniformly formed at each end thereof with a flange 7 provided with a series of radially directed slots 8. When it is desired to connect together two members 4 and 5, the ends are brought into close proximity with one another and there is introduced between the flanges of adjacent members 4 and 5 a plate 10 provided with lugs 11 on either side thereof which are arranged in planes perpendicular to the plane of the plate 10. The lugs 11 are spaced around the plate 10 and from the axis thereof at distances corresponding to the distances between the slots 8 formed in the flanges 7 and the distances of the slots 8 from the axis of each member. The lugs 11 on the plate 10 are shaped so that they are provided with portions 12 which overhang the plate and are directed towards the axis of the plate. The plate 10 is so constructed that when placed between the flanges 7 on the ends of two adjacent members 4 and 5 the flanges 7 upon the respective members may be disposed so that the slots 8 correspond with the lugs 11 on the plate 10 whereby an axial movement of the two members 4 and 5 towards one another brings the flanges 7 of the members 4 and 5 into contact with opposite sides of the plate 10 in the manner indicated in Figure 2, whereupon the members 4 and 5 may be given a part turn about their axes so as to bring the unslotted portion of the flanges 7 beneath the overhanging portion 12 of the lugs 11, thereby locking each member to the plate 10 and to one another, thus preventing the two members 4 and 5 from being unintentionally separated from one another in a longitudinal direction. The axial movement of the two members towards the plate with a subsequent part turn of the members about their axes constitutes a "bayonet action." There is provided upon the plate 10 a hole arranged to receive a split pin 13 which is preferably attached to the plate 10 by means of a chain 14. The pin 13 can be inserted into the hole in the plate 10 so as to extend through two adjacent slots 8 formed in the pair of flanges 7 of the two members 4 and 5 and in such a position prevent the members 4 and 5 from rotating relatively to the plate 10 sufficiently to bring the slots 8 of the flanges 7 adjacent to the lugs 11 on the plate 10 and thus allow the members 4 and 5 to become unintentionally disconnected.

It will be appreciated that the plates 10 which are arranged to extend between the adjacent members are uniform in character and therefore interchangeable as also is the case with the flanged spigots 9 which extend into the ends of the members.

If a series of members is connected together in the manner indicated above, it will be found that an articulated unit is formed in which the successive members are held together longitudinally, but wherein there exists sufficient play in the joints between adjacent members to prevent the members from being arranged one above the other in an upright direction with all the members coaxial with one another, without some form of lateral support.

The construction hereinbefore referred to with reference to Figures 1 and 2 provides a union adapted to be connected to and constitute a link between a pair 4 and 5 of adjacent rigid members of an articulated unit which when arranged upright forms, in conjunction with guys 16 operatively connected through hooks 15 and eyes 41 to the members 4 and 5, a flexible mast which comprises means in the form of flanges 7 and a plate 10 having lugs 11 disposed between adjacent members 4 and 5, which permits of a limited range of movement in all directions between adjacent members.

The hooks 15 are arranged upon the underside of each plate and preferably form an extension of each of the lower lugs of the plate. The guy ropes 16 are securable to said hooks 15 in such a position as to hold the ends of two adjacent members in a predetermined position. Thus it will be seen that by providing guys 16 at the joint where adjacent members are connected together, it is possible to arrange successive members so as to extend vertically from the ground with the axes of the members in alignment with one another and yet permit a limited range of movement in all directions between the said members.

An alternative construction of union adapted to be connected to and constitute the connecting link between adjacent members is illustrated in Figures 3 and 4. This construction consists in forming closed slots 44 in the plate 45 (Figure 3) which are arranged to receive lugs 46 permanently attached to the end of the guy ropes 47 so that when the lugs 46 are arranged to extend through the closed slots 44 in the plate 45 and through the open slots 48 in the flanged spigots 49 and the members to which the spigots are connected are given a part turn about the longitudinal axes thereof, the lugs 46 are locked to the union and serve to connect the ends of adjacent members 4 and 5 together. The plate 45 is prevented from moving and allowing its slots to come into line with the open slot 48 in the flanged member 49 by a split pin 50 (Figure 4).

What we claim as our invention and desire to secure by Letters Patent of the United States is:

1. A union for effecting connection between the abutting ends of alined sections of sectional masts, poles and the like, comprising like radially-extending flanges on at least one end of each section having spaced, radially-extending peripheral slots therein with unslotted portions between said slots; a plate positioned between said flanges when said sections are arranged in axial alinement with their flanged ends in close proximity; and lugs associated with said plate and extending on opposite sides thereof, each lug having on its inner face a notch extending above and below said plate and defining opposed, overhanging shoulders spaced a distance equal to at least the combined thicknesses of said flanges and said intermediate plate, the spacing of said lugs with respect to said plate corresponding to the spacing of the slots in said flanges, whereby the sections may be placed in axial alinement with the plate between the flanges and with the lugs disposed within the slots therein and may be rotated about their axes to a limited extent with respect to said plate and lugs to cause the opposed shoulders of said lugs to overhang the unslotted portions of said flanges to thus secure said sections together in substantial axial alinement.

2. A union as defined in claim 1 wherein the length of the notch on the inner face of each lug is greater than the combined thicknesses of the flanges and the intermediate plate, whereby the overhanging shoulders of said lugs permit limited movement of said sections with respect to each other.

3. A union as defined in claim 1 wherein the lugs are fixed on the plate.

4. A union as defined in claim 1 wherein the plate is provided with radial slots spaced to correspond with the spacing of the slots in the flanges, and the lugs are separate and are passed through the slots in the said flanges and said plate when said sections are alined.

5. A union as defined in claim 1 wherein means is provided for preventing rotation of said sections with respect to said plate and lugs when the shoulders of the lugs overhang the unslotted portions of the flanges.

6. A union as defined in claim 1 wherein the plate has a hole extending therethrough in alinement with alined slots in the flanges of the sections when the shoulders of the lugs overhang the unslotted portions of the flanges, and wherein a pin is inserted through said alined slots and hole to prevent relative rotation between said flanges and intermediate plate.

7. A union as defined in claim 1 wherein the plate has a hole extending therethrough in alinement with alined slots in the flanges of the sections when the shoulders of the lugs overhang the unslotted portions of said flanges and wherein a pin is inserted through said alined slots and hole, the diameter of said pin being less than the walls defining said slots whereby limited relative rotation is permitted between said flanges and intermediate plate.

WILLIAM CHARLES SCRIVENER.
ALFRED GEORGE BREWER.